(12) United States Patent
Bui

(10) Patent No.: US 7,191,861 B2
(45) Date of Patent: Mar. 20, 2007

(54) ELECTROMAGNET PROPELLED WHEELED VEHICLE

(76) Inventor: Phuong Bui, 7402 E. 29th St., Tucson, AZ (US) 85710

( * ) Notice: Subject to any disclaimer, the term of this patent is extended or adjusted under 35 U.S.C. 154(b) by 0 days.

(21) Appl. No.: 10/952,972

(22) Filed: Sep. 28, 2004

(65) Prior Publication Data

US 2006/0065460 A1    Mar. 30, 2006

(51) Int. Cl.
*B62M 23/02*    (2006.01)
*B62M 1/00*    (2006.01)

(52) U.S. Cl. .................... 180/205; 180/220; 280/212

(58) Field of Classification Search ............ 180/205, 180/219, 220; 280/212
See application file for complete search history.

(56) References Cited

U.S. PATENT DOCUMENTS

| | | | |
|---|---|---|---|
| 3,921,745 A | | 11/1975 | McCulloch et al. |
| 4,062,421 A | * | 12/1977 | Weber .................... 180/205 |
| 4,095,663 A | * | 6/1978 | Gaffney .................... 180/205 |
| 4,871,042 A | | 10/1989 | Hsu et al. |
| 5,594,289 A | | 1/1997 | Minato |
| 5,788,007 A | * | 8/1998 | Miekka .................... 180/205 |
| 5,789,841 A | | 8/1998 | Wang |
| 6,093,985 A | | 7/2000 | Chen |
| 6,131,683 A | | 10/2000 | Wada |
| 6,717,324 B2 | | 4/2004 | Chen |
| 2004/0056549 A1 | * | 3/2004 | Chen .................... 310/166 |

* cited by examiner

*Primary Examiner*—Lesley D. Morris
*Assistant Examiner*—Marc A. Scharich
(74) *Attorney, Agent, or Firm*—Dale F. Regelman

(57) ABSTRACT

A wheeled vehicle is disclosed where that vehicle includes at least one disk, i.e. wheel, and a plurality of permanent magnets disposed around that wheel. The vehicle further includes a frame, where the wheel is rotatably connected to that frame. The vehicle further includes a source of electric power, and one or more electromagnet assemblies, each assembly comprising a first electromagnetic pole and a second electromagnet pole, where the first electromagnet pole and the second electromagnet pole are separated by a gap, and where one or more electromagnet assemblies are disposed on the frame such that each of the plurality of permanent magnets sequentially passes through the gaps in each assembly as the wheel rotates. The vehicle further includes a control unit capable of receiving power from the power source and selectively providing power to the one or more electromagnet assemblies.

13 Claims, 10 Drawing Sheets

ELECTROMAGNET PROPELLED WHEELED VEHICLE

FIELD OF THE INVENTION

The invention relates to a wheeled vehicle which includes an electromagnet propulsion system.

BACKGROUND OF THE INVENTION

Prior art vehicles using some sort of electric propulsion, such as for example electric bicycles, electric motorcycles, and electric cars, generally utilize electricity provided by batteries and/or generators to power electric motors. The output that electric motor is coupled to a drive shaft output to propel the vehicle forward.

Such prior art devices necessarily require complex motor mounting and output shaft coupling to the drive wheel which takes up precious space, increases weight and loses mechanical efficiency.

In addition, operation of the vehicle, particularly for long distances, demands large amounts of power which then requires large and multiple batteries. Such battery arrays increase the weight, i.e. the load, of the vehicle, which in and of itself greatly increases the consumption of electric power.

SUMMARY OF THE INVENTION

Applicant's invention includes a wheeled vehicle. That wheeled vehicle comprises at least one disk, i.e. a wheel, and a plurality of permanent magnets disposed on that wheel. The vehicle further includes a frame, where the wheel is rotatably connected to that frame. The vehicle further includes a source of electric power, and one or more electromagnet assemblies, each such assembly comprising a first electromagnetic pole and a second electromagnet pole separated by a gap. The electromagnet assemblies are disposed on the frame such that each of the plurality of permanent magnets sequentially pass through the gap in each of the one or more electromagnet assemblies as the wheel rotates. Applicant's vehicle further includes a control unit capable of receiving power from the power source and selectively providing power to the one or more electromagnet assemblies.

DETAILED DESCRIPTION OF THE PREFERRED EMBODIMENTS

Referring to the illustrations, like numerals correspond to like parts depicted in the Figures. The invention will be described as embodied in bicycle having one wheel which includes two permanent magnets symmetrically disposed adjacent the periphery that wheel. The following description of Applicant's apparatus and method is not meant, however, to limit Applicant's invention to a single wheel on a wheeled vehicle, or to bicycles, as the apparatus and method described and claimed can provide a propulsion system for any wheeled vehicle.

Figure 1:
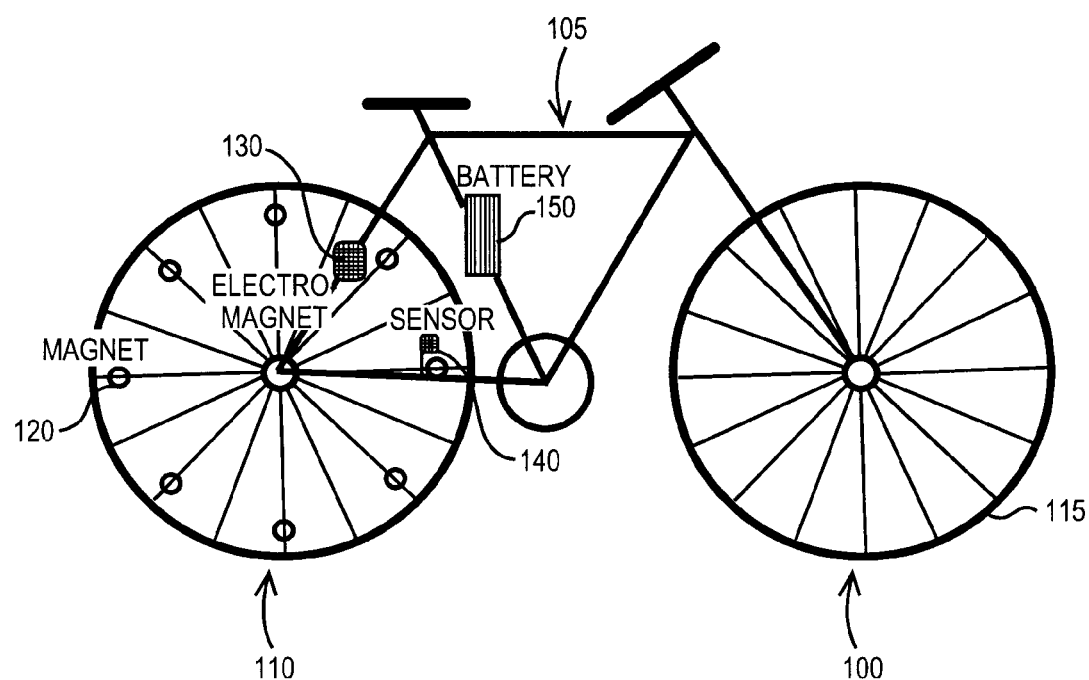
FIG. 1 shows a side view of one embodiment of Applicant's wheeled vehicle which includes a plurality of permanent magnets disposed on one wheel, an electromagnet assembly disposed on the frame, a battery disposed on the frame, and a control unit disposed on the frame.

In the illustrated embodiment of FIG. 1, Applicant's bicycle 100 includes frame 105, first rotatable disk 110, i.e. the rear wheel assembly, second rotatable disk 115, i.e. the front wheel assembly, a plurality of permanent magnets 120 disposed on rotatable disk 110, electromagnet 130 disposed on frame 105 such that as disk 110 rotates each of the plurality of magnets sequentially passes adjacent to, or through, electromagnet 130, and control unit 140 disposed on frame 105 such that as disk 110 rotates each of the plurality of magnets 120 passes adjacent control unit 140. Applicant's plurality of permanent magnets comprise (N) permanent magnets disposed with equal spacing around the periphery of a rotatable disk with the same magnetic polarity to one side of the disk, wherein (N) is an integer greater than 1, such as for example 2, 3, 4, 5, 6, 7, 8, and the like.

In the illustrated embodiment of FIG. 1, plurality of magnets 120, electromagnet 130, and control unit 140, are disposed on disk 110 but not on disk 115. In other embodiments, a separate plurality of magnets 120, electromagnet 130, and control unit 140, are disposed on disk 115 as well as on disk 110. In these embodiments, the plurality of magnets 120, the electromagnet 130, and the control unit 140, are disposed on disk 115 in the same manner as those elements are disposed on disk 110.

In certain embodiments, battery 150 provides 12 volt DC current. In other embodiments, battery 150 provides 24 volt DC current. In other embodiments, battery 150 provides 36 volt DC current. In certain embodiments, battery 150 comprises a rechargeable battery.

In the illustrated embodiment of FIG. 1, battery 150 comprises a single cell. In other embodiments, battery 150 comprises an array of interconnected batteries. In certain embodiments, Applicant's apparatus 100 includes one or more interconnected batteries where that battery array provides power to electromagnet 130.

In other embodiments, Applicant's apparatus 100 includes one or more interconnected batteries that provide power to electromagnet 130 in combination with one or more batteries that do not provide power to electromagnet 130. Therefore in these embodiments, Applicant's apparatus includes one or more active batteries and one or more reserve batteries. In these reserve battery embodiments, in the event one or more of the active batteries fails, those one or more failed batteries can be replaced by one or more reserve batteries.

Applicant's electromagnet propulsion system may be used with any kind of wheeled vehicle. The illustrated embodiment of FIG. 1 shows bicycle 100. In certain embodiments, bicycle 100 comprises what is sometimes referred to as a "road" bicycle engineered for use on paved roads. In certain embodiments, bicycle 100 comprises what is sometimes referred to as a "mountain" bicycle engineered for use on non-paved paths. In certain embodiments, bicycle 100 comprises what is sometimes referred to as a "tandem" bicycle engineered for use by two riders.

In other embodiments, Applicant's apparatus comprises a unicycle. In yet other embodiments, Applicant's apparatus comprises a tricycle. In these tricycle embodiments, one, two, or three wheels may each include a plurality of magnets 120. Where Applicant's tricycle includes one magnet-equipped wheel, then the frame of that tricycle includes a one electromagnet 130 and one control unit 140 disposed on the frame in the manner described below. Where Applicant's tricycle includes two magnet-equipped wheels, then the frame of that tricycle includes two electromagnets 130 and two sensors 140 disposed on the frame in the manner described below. Where Applicant's tricycle includes three magnet-equipped wheels, then the frame of that tricycle includes three electromagnets 130 and three sensors 140 disposed on the frame in the manner described below.

In yet other embodiments, Applicant's apparatus comprises a quadricycle. In these quadricycle embodiments, one, two, three, or four wheels may each include a plurality of magnets 120. Where Applicant's quadricycle includes one magnet-equipped wheel, then the frame of that tricycle includes a one electromagnet 130 and one control unit 140 disposed on the frame in the manner described below. Where Applicant's quadricycle includes two magnet-equipped wheels, then the frame of that tricycle includes two electromagnets 130 and two sensors 140 disposed on the frame in the manner described below. Where Applicant's quadricycle includes three magnet-equipped wheels, then the frame of that tricycle includes three electromagnets 130 and three sensors 140 disposed on the frame in the manner described below. Where Applicant's quadricycle includes four magnet-equipped wheels, then the frame of that tricycle includes four electromagnets 130 and four sensors 140 disposed on the frame in the manner described below.

Figure 2:
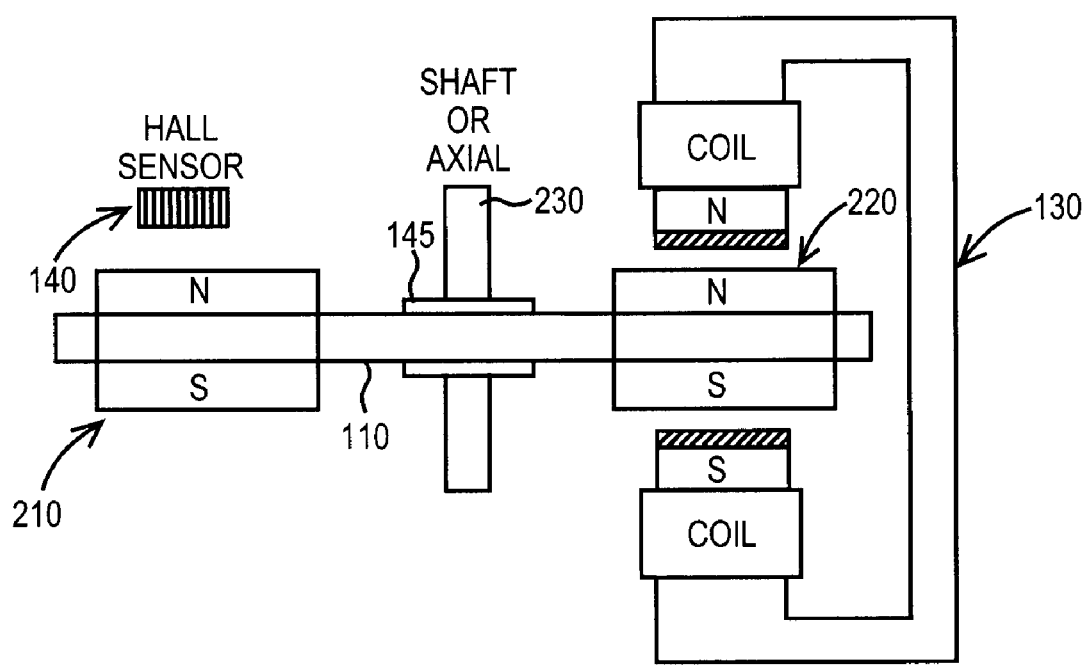
FIG. 2 shows a side view of one of the wheels of the vehicle of FIG. 1 in combination with a Hall sensor and an electromagnet assembly.
Figure 3:
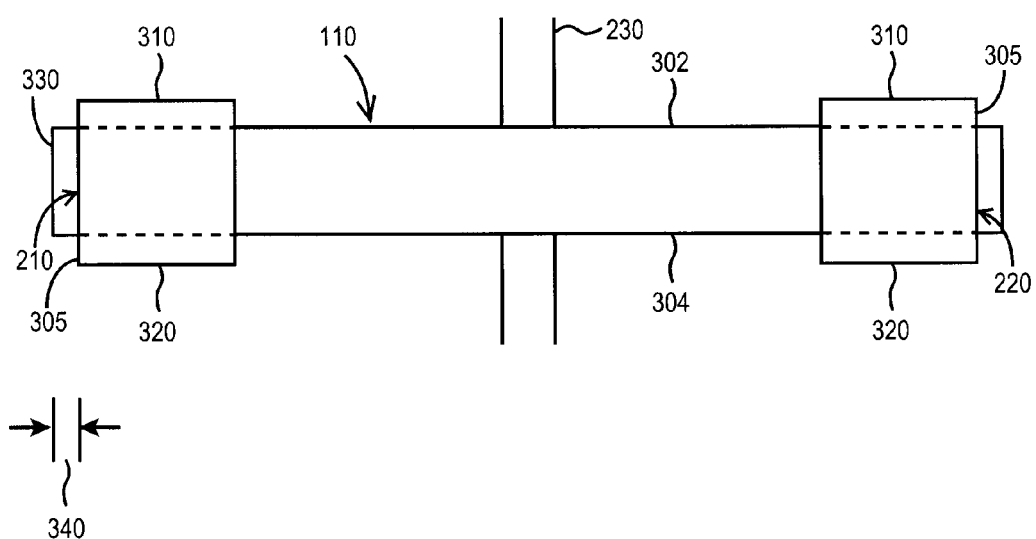
FIG. 3 shows a side view of a wheel assembly which includes two permanent magnets symmetrically disposed adjacent the periphery of that wheel.

In the illustrated embodiment of FIGS. 2 and 3, (N), that is the number of permanent magnets used, is 2. Referring to FIG. 2, axial 230 passes through an aperture disposed at the center point of disk 110 and rides on an axial bearing 145. Referring now to FIGS. 2 and 3, permanent magnets 210 and 220 are symmetrically disposed on disk 110 adjacent its periphery 330. The distal sides 305 of magnets 210 and 220 are disposed a distance 340 from periphery 330 of disk 110. In certain embodiments, distance 340 is between 0 centimeters and about 15 centimeters in length.

Permanent magnets 210 and 220 each comprise a first magnetic pole 310 having a first magnetic polarity and a second magnetic pole 320 having a second magnetic polarity. In certain embodiments, the first magnetic polarity is sometimes referred to as the north or "N" polarity. In certain embodiments, the second magnetic polarity is sometimes referred to as the south or "S" polarity.

Disk 110 includes a first side 302 and a second side 304. Magnets 210 and 220 are disposed on disk 110 such that the first pole 310 of each of those magnets extends outwardly from the first side 302 of disk 110, and such that the second pole 320 of each of those magnets extends outwardly from the second side 304 of disk 110

Figure 4:
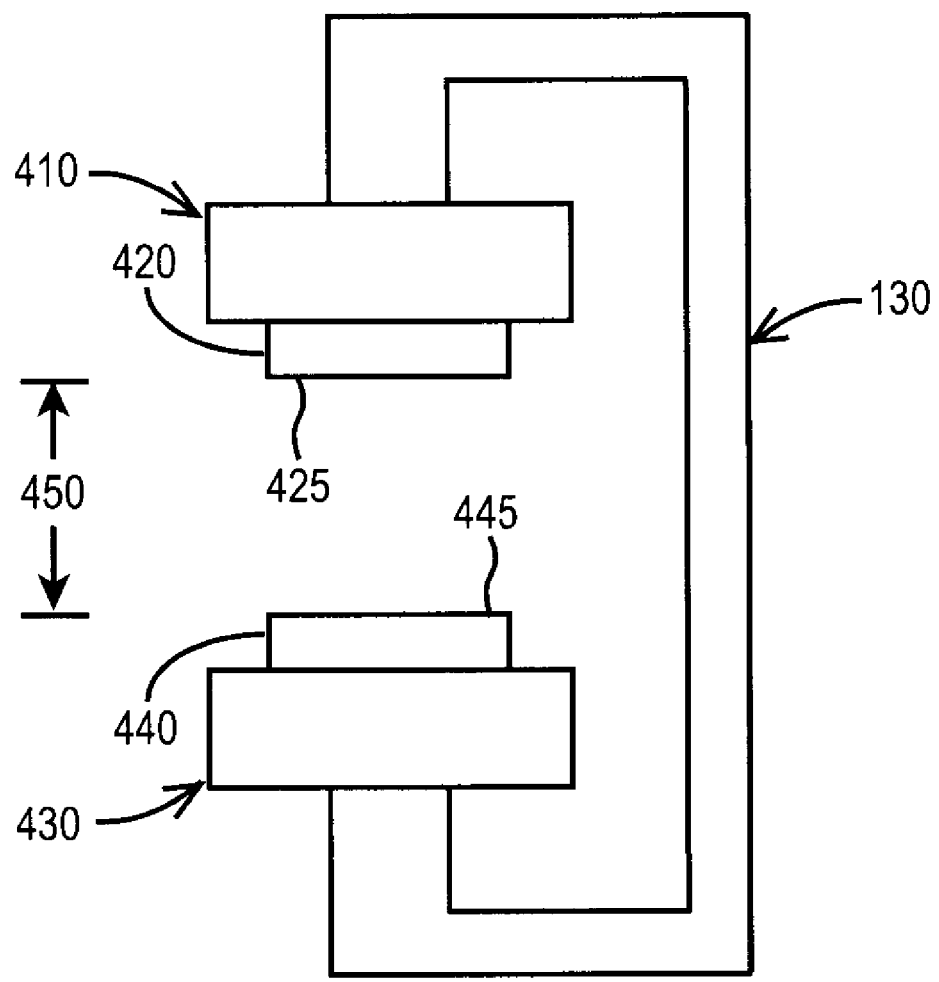
FIG. 4 shows a side view of Applicant's electromagnet assembly.

Referring to FIG. 4, electromagnet assembly 130 (FIGS. 1, 2, 3) includes first coil 410 and second coil 430. First coil 410 includes first electromagnetic pole 420. Second coil 430 includes second electromagnetic pole 440. A gap 450 separates first electromagnetic pole 420 and second electromagnetic pole 440. In certain embodiments, gap 450 is between about 1 centimeter and about 10 centimeter in length.

Electromagnet assembly 130 is formed such that electromagnet pole 420 has no magnetic polarity when electromagnet assembly 130 is not energized, and such that electromagnet pole 420 has a first magnetic polarity when electromagnet assembly 130 is energized. Similarly, electromagnet assembly 130 is formed such that electromagnet pole 440 has no magnetic polarity when electromagnet assembly 130 is not energized, and such that electromagnet pole 440 has a second magnetic polarity when electromagnet assembly 130 is energized.

Figure 5:
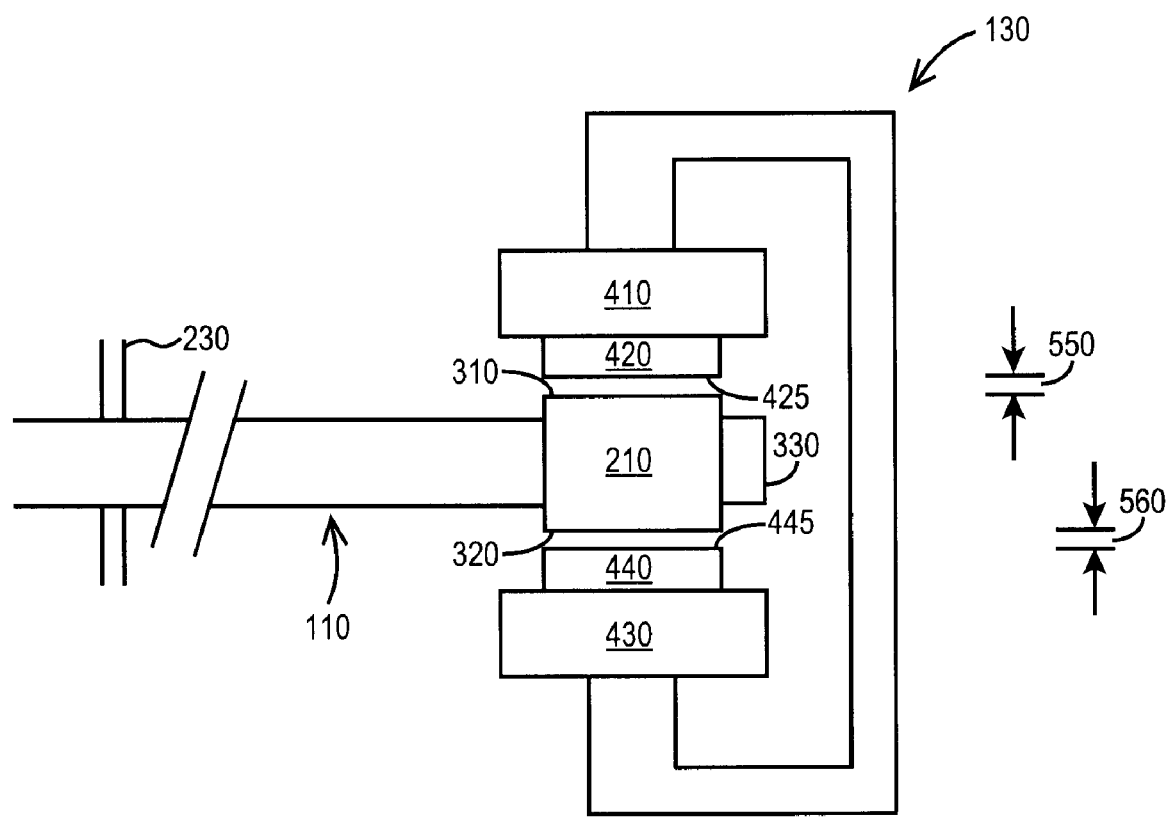
FIG. 5 shows a permanent magnet disposed on a wheel disposed within a gap in the electromagnet assembly of FIG. 4.

FIG. 5 shows the distal portion of disk 110 in combination with electromagnet assembly 130. In the illustrated embodiment of FIG. 5, disk 110 is positioned such that permanent magnet 210 is located within gap 450 (FIG. 4). Further in the illustrated embodiment of FIG. 5, magnetic pole 310 of magnet 210 is disposed a distance 550 from distal end 425 of electromagnet pole 420. In certain embodiments, distance 550 is between about 1 millimeter and about 10 millimeters. Further in the illustrated embodiment of FIG. 5, magnetic pole 320 of magnet 210 is disposed a distance 560 from distal end 445 of electromagnet pole 430. In certain embodiments, distance 560 is between about 1 millimeter and about 10 millimeters. In certain embodiments, distance 450 substantially equals distance 460. By "substantially equals," Applicant means within about plus or minus ten percent (10%). In other embodiments, distance 450 differs from distance 460.

Electromagnet pole 420 has no magnetic polarity when electromagnet assembly 130 is not energized. Permanent magnet 210 is disposed on disk 110 such that permanent magnet pole 310 comprises the first magnetic polarity. Electromagnet pole 440 has no magnetic polarity when electromagnet assembly 130 is not energized. Permanent magnet 210 is disposed on disk 110 such that permanent magnet pole 320 comprises the second magnetic polarity.

Figure 6:
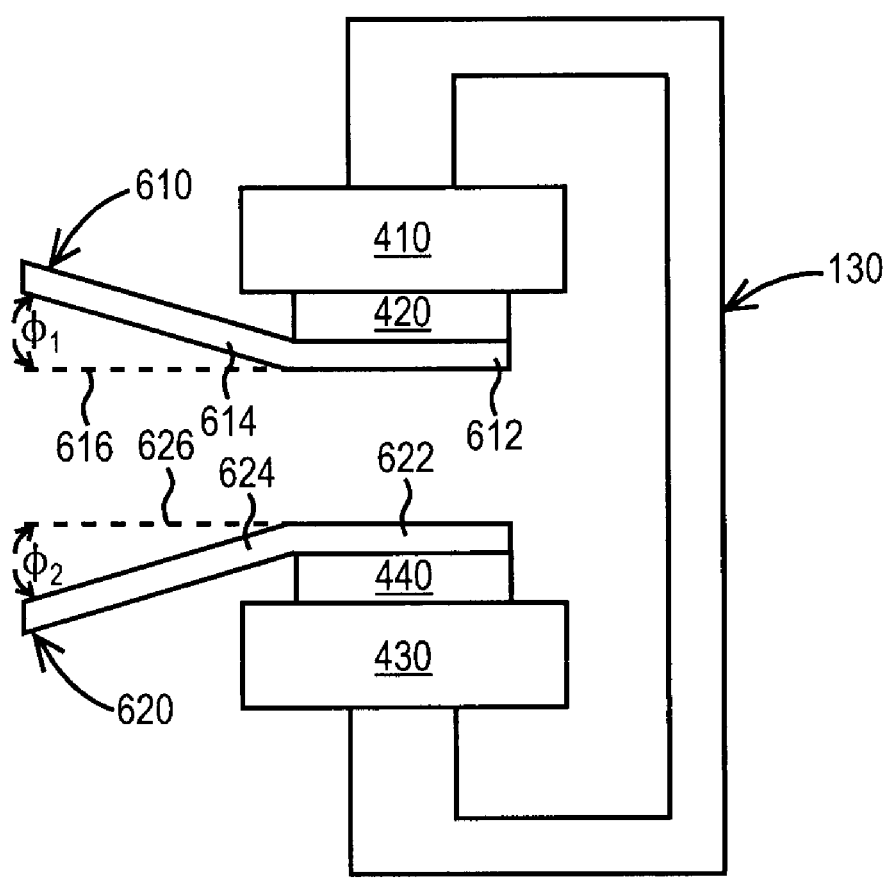
FIG. 6 shows the electromagnet assembly of FIG. 4 further comprising a pair of flux guides.

Referring now to FIG. 6, in certain embodiments Applicant's electromagnet assembly 130 further includes flux guide 610 and/or flux guide 620. Flux guide 610 comprises a ferromagnetic material, such as without limitation iron or steel. Portion 612 of flux guide 610 is attached, physically and magnetically, to distal end 425 of electromagnet pole 420 such that flux guide 610 comprises the same magnetic polarity as does electromagnet pole 420. Portion 614 of flux guide 610 is offset from portion 612 by angle $\Phi_1$. In certain embodiments, offset angle $\Phi_1$ is between 0 degrees and about 30 degrees. In certain embodiments, offset angle $\Phi_1$ is about 5 degrees.

Flux guide 620 comprises a ferromagnetic material, such as without limitation iron or steel. Portion 622 of flux guide 620 is attached, physically and magnetically, to distal end 445 of electromagnet pole 440 such that flux guide 620 comprises the same magnetic polarity as does electromagnet pole 440. Portion 624 of flux guide 620 is offset from portion 622 by angle $\Phi_2$. In certain embodiments, offset angle $\Phi_2$ is between 0 degrees and about 30 degrees. In certain embodiments, offset angle $\Phi_2$ is about 5 degrees. In certain embodiments, offset angle $\Phi_2$ substantially equals offset angle $\Phi_2$. In other embodiments, offset angle $\Phi_1$ differs from offset angle $\Phi_2$.

Figure 7:
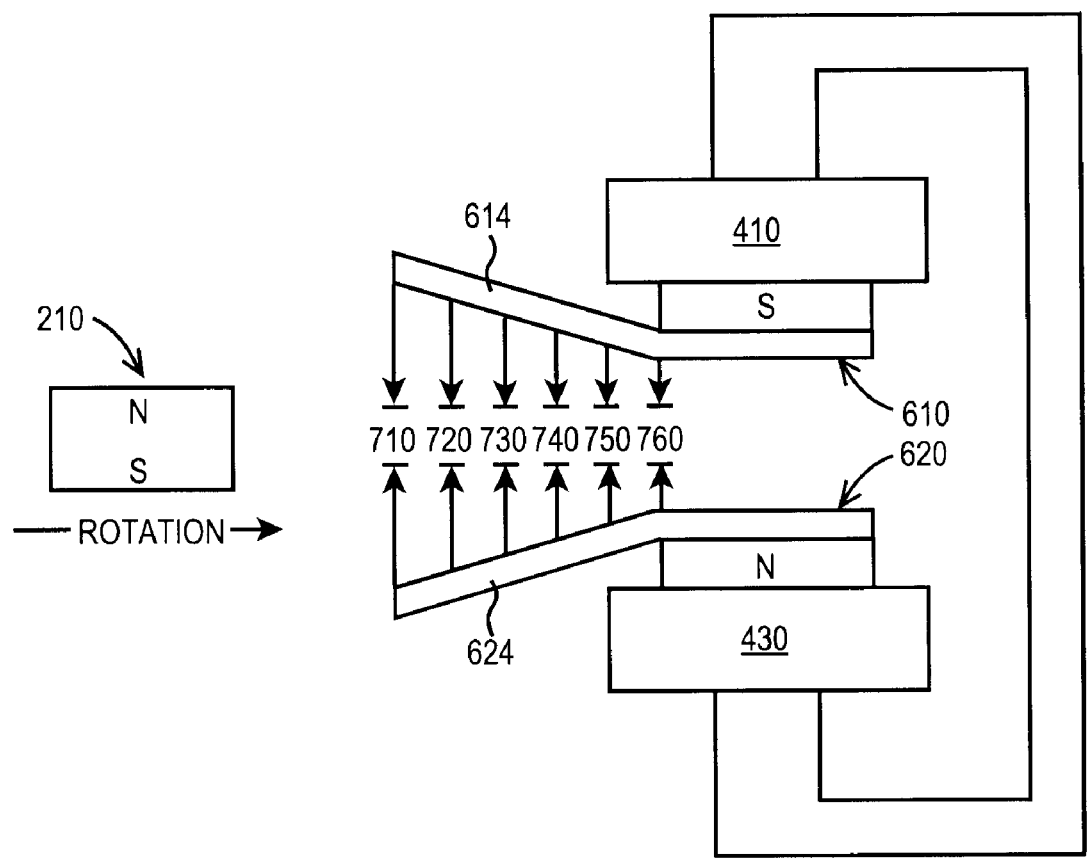
FIG. 7 shows a side view of the device of FIG. 6.

Referring now to FIG. 7, flux guide portion 614 and flux guide portion 624 are formed and disposed in electromagnet assembly such that the gap between portions 614 and 624 decreases from the distal ends of portions 612/614 to the proximal ends of portions 612 and 614. As disk 110 rotates and permanent magnet 210 approaches electromagnet assembly 130, magnet 210 is first disposed between portions 614 and 624 having a gap 710. As disk 110 continues to rotate, permanent magnet 210 moves within offset portions 614 and 624 having continuously decreasing gaps 720, 730, 740, 750, and 760.

Figure 8:
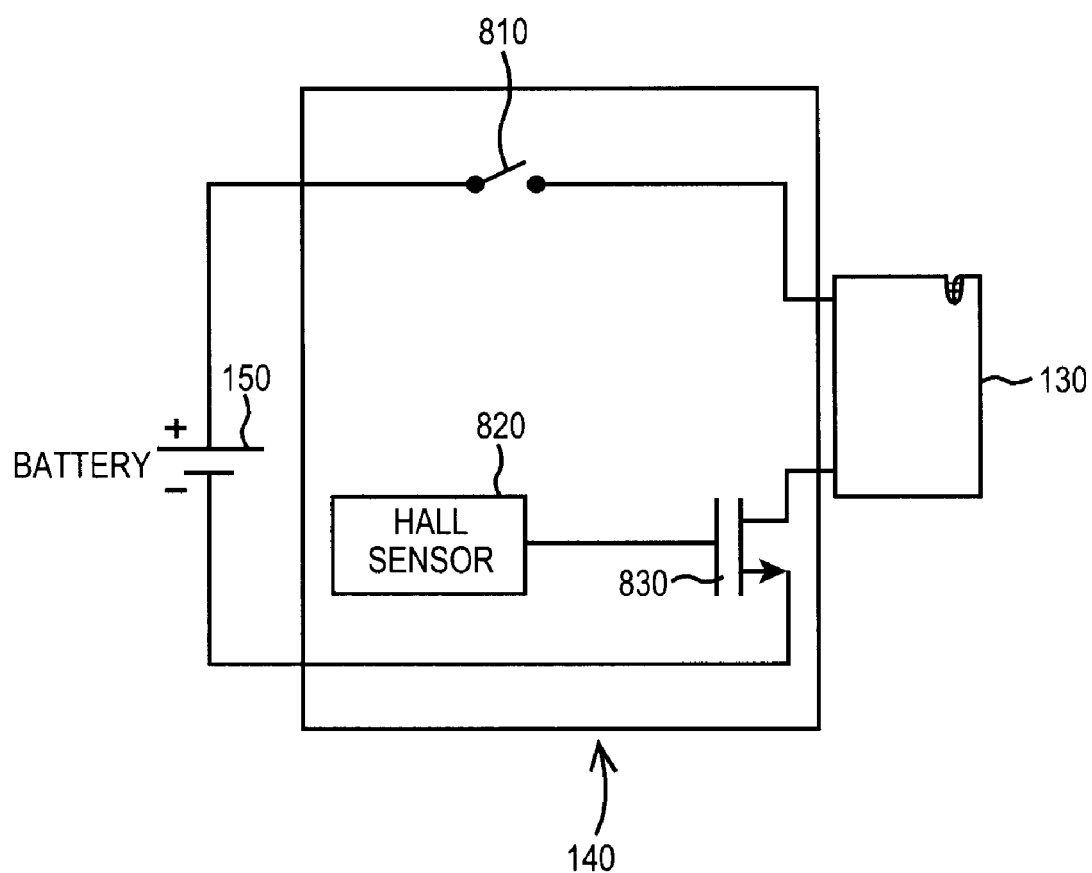
FIG. 8 is a block diagram of Applicant's control unit.
Figure 9:
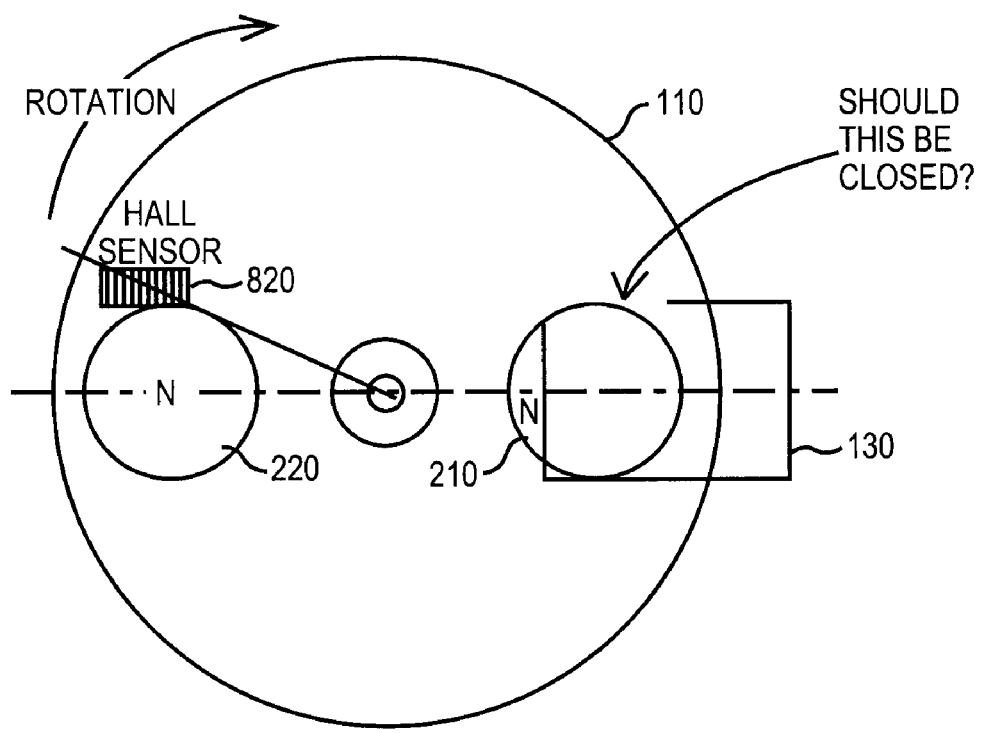
FIG. 9 is a block diagram showing the orientations of two permanent magnets disposed on a wheel and the electromagnet assembly attached to the frame and a Hall sensor disposed in Applicant's control unit.

Referring now to FIGS. 8 and 9, control unit 140 includes switch 810, hall sensor 820, and control chip 830. In certain embodiments, control chip 830 comprises a FET. Hall sensor 820 is disposed on frame 105 such that when permanent magnet 210 is disposed within gap 450 of electromagnet assembly 130, permanent magnet 220 is disposed adjacent hall sensor 820.

As disk 110 rotates, i.e. as Applicant's wheeled vehicle 100 moves forward, a permanent magnet, such as permanent magnet 210, approaches the magnetic flux guides, such as flux guides 610 and 620. The magnetic polarity of the flux guides when electromagnet assembly 130 is not energized attracts the approaching permanent magnet. Because the gap between the flux guides and the permanent magnets decreases as the permanent magnet moves into electromagnet assembly 130, i.e. moves toward portions 612 and 624 of the flux guides, the increasing magnet attraction between the permanent magnet and the electromagnet pulls disk 110 forward.

When permanent magnet pole 210 and electromagnet poles 420 and 440 align, permanent magnet 220 is adjacent hall sensor 820. Hall sensor 820 then becomes active and signals control chip 830. Control chip 830 then energizes electromagnet assembly 130 such that electromagnet pole 420 and permanent magnet pole 310 have the same magnetic polarity and such that electromagnet pole 440 and permanent magnet pole 320 have the same magnetic polarity. Thus when electromagnet assembly 130 is energized, electromagnet pole 420 and permanent magnet pole 310 repel each other and electromagnet pole 440 and permanent magnet pole 320 repel each other. This combined magnetic repulsion pushes rotating disk 110 forward.

Then as permanent magnet 220 moves away from hall sensor 820, that hall sensor becomes inactive causing the circuit controller 830 to deactivate electromagnet assembly 130 thereby stopping the consumption of electrical energy. The moment of inertia will continue rotating disc 110 such that permanent magnet 220 approaches the flux guides. The cycle of energizing and de-energizing electromagnet assembly 130 is repeated and the disc rotates continuously. Applicant's energy efficient propelling invention can be mounted on any simple or complex structure to propel bicycles, vehicles or generators.

Figure 10:
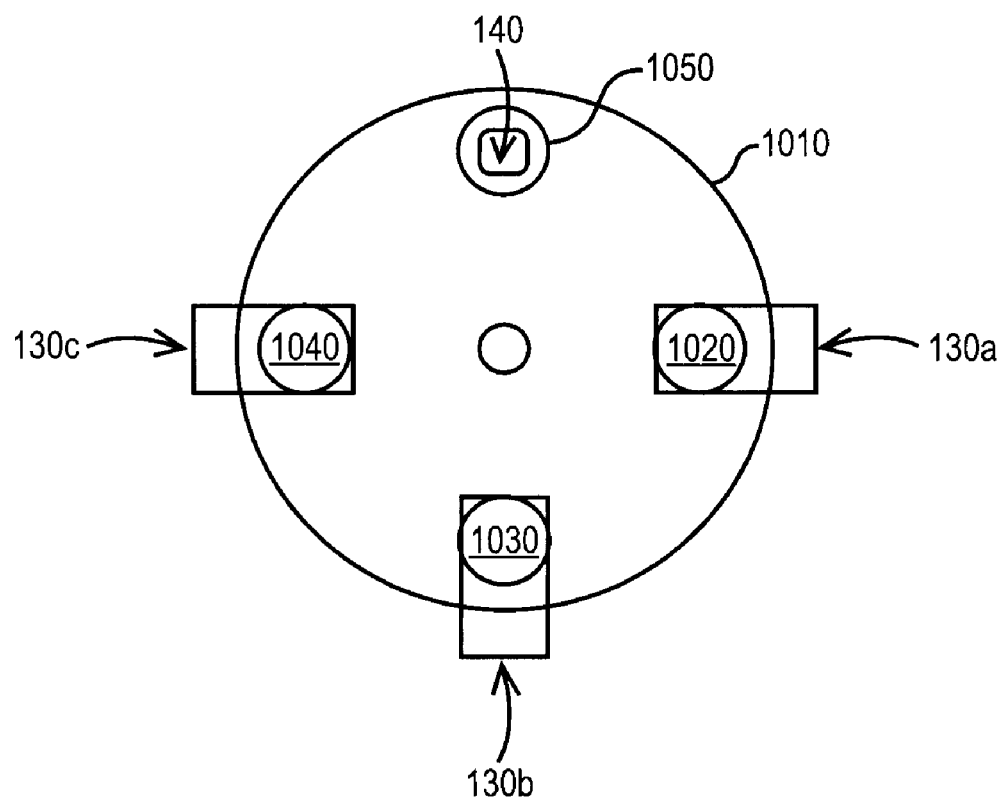
FIG. 10 is a block diagram showing use of (N) permanent magnets and (N−1) electromagnet assemblies, wherein (N) is 4.

Referring now to FIG. 10, in certain embodiments Applicant's wheeled vehicle utilizes (N) permanent magnets disposed with equal spacing around the periphery of a wheel, in combination with (N−1) electromagnet assemblies 130 and one control unit 140 disposed on frame 105.

In the illustrated embodiment of FIG. 10, (N) is four. The (N−1) electromagnet assemblies 130(a), 130(b), and 130(c), and the control unit 140, are disposed on frame 105 such, as wheel 1010, rotates, as a first permanent magnet, such as permanent magnet 1020, moves into a gap 450 (FIG. 4) of one of the (N−1) electromagnet assemblies, such as electromagnet assembly 130(a), then a second permanent magnet, such as permanent magnet 1050 is aligned with control unit 140, and each of the remaining (N−2) permanent magnets, such as magnets 1030 and 1040, moves into a gap 450 of a different one of the electromagnet assemblies, such as electromagnet assemblies 130(b) and 130(c), respectively.

In the illustrated embodiment of FIG. 10, as permanent magnets 1020, 1030, and 1040, approach electromagnet assemblies 130(a), 130(b), and 130(c), respectively, magnets 1020, 1030, and 1040, are magnetically attracted to assemblies 130(a), 130(b), and 130(c), respectively, and the combined magnet attraction pulls wheel 1010 forward.

As wheel 1010 moves into the orientation shown in FIG. 10, control unit 140 energizes electromagnet assemblies 130(a), 130(b), and 130(c), and those energized electromagnet assemblies repel permanent magnets 1020, 1030, and 1040, respectively. The magnetic repulsion pushes wheel 1010 forward.

While the preferred embodiments of the present invention have been illustrated in detail, it should be apparent that modifications and adaptations to those embodiments may occur to one skilled in the art without departing from the scope of the present invention as set forth in the following claims.

I claim:

1. A wheeled vehicle, comprising:
   at least one disk;
   (N) permanent magnets disposed on said disk with the same magnetic polarity to one side of the disk, wherein (N) is greater than or equal to 2;
   a frame, wherein said at least one disk is rotatably connected to said frame;
   a power source;
   at least one and up to (N-1) electromagnet assemblies disposed on said frame, wherein each of those electromagnet assemblies comprises a first electromagnetic pole and a second electromagnet pole, wherein said first electromagnet pole and said second electromagnet pole are separated by a gap, and wherein the one to (N-1) electromagnet assemblies are disposed on said frame such that each of said (N) permanent magnets sequentially pass through the gap in each of the one to (N-1) electromagnet assemblies as said disk rotates;
   a control unit disposed on said frame and interconnected with said power source, wherein said control unit is capable of selectively providing power to each of said one to (N-1) electromagnet assemblies;
   wherein said first electromagnet pole has no magnetic polarity when said electromagnet assembly is not energized, and wherein said first electromagnet pole has a first magnetic polarity when said electromagnet assembly is energized;
   wherein said second electromagnet pole has said no magnetic polarity when said electromagnet assembly is not energized, and wherein said second electromagnet pole has a second magnetic polarity when said electromagnet assembly is energized;
   wherein one or more of said one to (N-1) electromagnet assemblies further comprises a first flux guide formed from a ferromagnetic material, wherein said first flux guide is physically and magnetically attached to said first electromagnet pole, and wherein said first flux guide has the said magnetic polarity as said first electromagnet pole.

2. The wheeled vehicle of claim 1, wherein said first flux guide comprises a first portion physically and magnetically attached to said first electromagnet pole and a second portion physically and magnetically attached to and offset from said first portion by an offset angle.

3. The wheeled vehicle of claim 2, wherein said offset angle is about 5 degrees.

4. The wheeled vehicle of claim 1, wherein one or more of said one to (N-1) electromagnet assemblies further comprises a second flux guide formed from a ferromagnetic material, wherein said second flux guide is physically and magnetically attached to said second electromagnet pole, and wherein said second flux guide has the said magnetic polarity as said second electromagnet pole.

5. The wheeled vehicle of claim 4, wherein said second flux guide comprises a first portion physically and magnetically attached to said second electromagnet pole and a second portion physically and magnetically attached to and offset from said first portion by an offset angle.

6. The wheeled vehicle of claim 4, wherein said offset angle is about 5 degrees.

7. The wheeled vehicle of claim 1, wherein said control unit comprises a Hall sensor and a control chip interconnected with said Hall sensor, wherein said control unit is disposed on said frame such that when a first one of the (N) permanent magnets is disposed within the gap of an electromagnet assembly a second one of the (N) permanent magnets is disposed adjacent the Hall sensor.

8. A method to propel a bicycle, comprising the steps of:
providing a bicycle comprising a first wheel and a second wheel, wherein said first wheel includes a periphery and (N) permanent magnets equally spaced around said periphery with the same magnetic polarity to one side of the disk; a frame wherein said first wheel and said second wheel are rotatably connected to said frame; a power source; at least one and up to (N-1) electromagnet assemblies, wherein each of those one to (N-1) electromagnet assemblies comprises a first electromagnetic pole and a second electromagnet pole, wherein said first electromagnet pole and said second electromagnet pole are separated by a gap, and wherein each of the one to (N-1) electromagnet assemblies are disposed on said frame such that each of said (N) permanent magnets sequentially pass through the gap in each of the one to (N-1) electromagnet assemblies as said first wheel rotates; a control unit capable of receiving power from said power source and selectively providing power to each of said one to (N-1) electromagnet assemblies, wherein (N) is reater than or equal to 2;

rotating said first wheel to propel said bicycle in a forward direction;

attracting said one to (N-1) electromagnet assemblies by a different permanent magnet as one to (N-1) permanent magnets approach the one to (N-1) electromagnet assemblies;

repelling a different one of said one to (N-1) electromagnet assemblies by each of said one to (N-1) permanent magnets as those one to (N-1) permanent magnets move away from the one to (N-1) electromagnet assemblies;

wherein one or more of said one to (N-1) electromagnet assemblies further comprises a first flux guide formed from a ferromagnetic material, wherein said first flux guide is physically and magnetically attached to said first electromagnet pole, and wherein said first flux guide has the said magnetic polarity as said first electromagnet pole.

9. The method of claim 8, wherein said first flux guide comprises a first portion physically and magnetically attached to said first electromagnet pole and a second portion physically and magnetically attached to and offset from said first portion by a first offset angle.

10. The method of claim 9, wherein said first offset angle is about 5 degrees.

11. The method of claim 8, wherein one or more of said one to (N-1) electromagnet assemblies further comprising a second flux guide formed from a ferromagnetic material, wherein said second flux guide is physically and magnetically attached to said second electromagnet pole, and wherein said second flux guide has the said magnetic polarity as said second electromagnet pole.

12. The method of claim 11, wherein said second flux guide comprises a first portion physically and magnetically attached to said second electromagnet pole and a second portion physically and magnetically attached to and offset from said first portion by a second offset angle.

13. The method of claim 12, wherein said second offset angle is about 5 degrees.

* * * * *